H. M. & J. F. RULON.
Steam Generator.
No. 4,833. Reissued March 26, 1872.
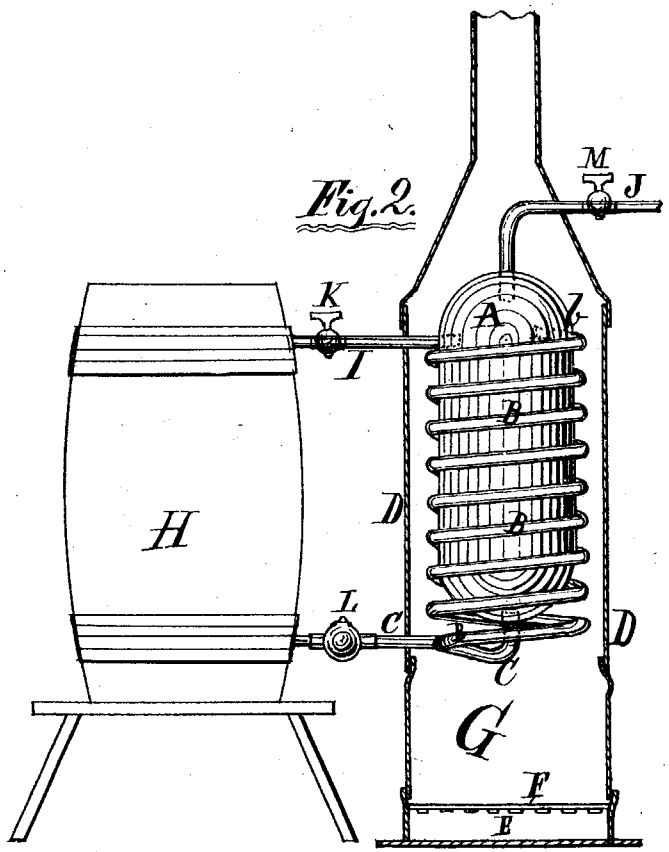
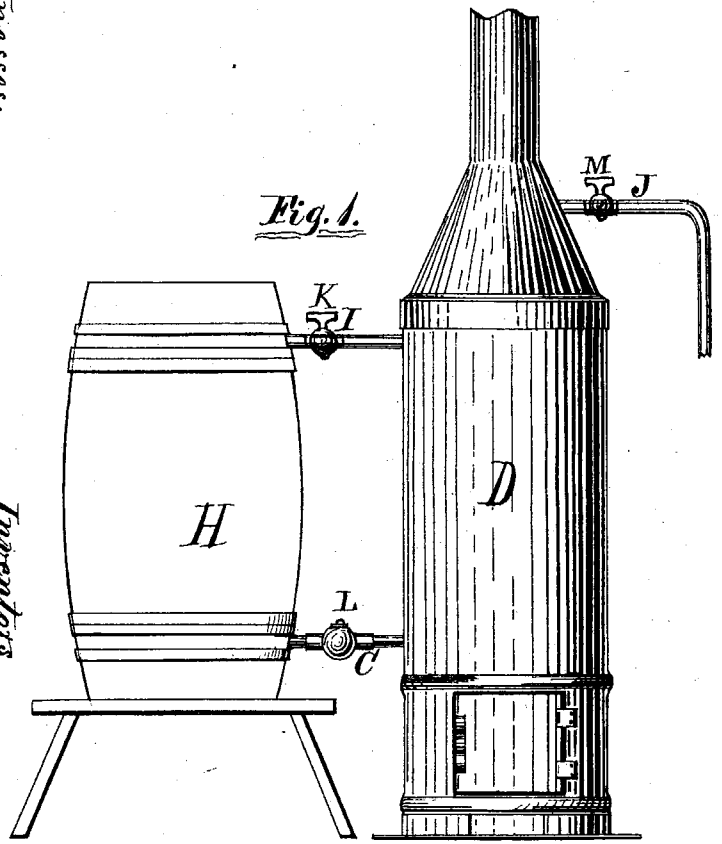
Witnesses:—
Platt R. Richards,
J. J. Tunnicliff.
Inventors
Henry M. & Jesse F. Rulon,
by their Atty. W. B. Richards.
AM. PHOTO-LITHOGRAPHIC CO. N.Y. (OSBORNE'S PROCESS.)

UNITED STATES PATENT OFFICE.

HENRY M. RULON AND JESSE F. RULON, OF MONMOUTH, ILLINOIS, ASSIGNORS TO THEMSELVES AND WILLIAM CLARK, OF SAME PLACE.

IMPROVEMENT IN STEAM-GENERATORS.

Specification forming part of Letters Patent No. 117,569, dated August 1, 1871; reissue No. 4,833, dated March 26, 1872.

*To all whom it may concern:*

Be it known that we, HENRY M. RULON and JESSE F. RULON, of Monmouth, county of Warren and State of Illinois, have invented certain Improvements in Steam-Generators, of which the following is a specification:

The nature of our invention relates to improvements in that class of steam-generators generally known as feed-steamers; and the invention consists in the arrangement of a hollow tube spirally encircling a central cylinder, and the whole surrounded by a suitable casing and combined with a feed-reservoir, steam-pipes, and fire-box in such manner as to produce a cheap, portable, and effective feed-steamer for the purpose of cooking feed for stock, all as hereinafter fully described.

Figure 1 is a side elevation of our invention. Fig. 2 is a side elevation of the interior arrangements of Fig. 1, and a vertical section of the outside casing of the steamer.

A represents a hollow cylinder closed at both ends. B is a tube or pipe loosely encircling the cylinder A, its upper end inserted into and communicating with the interior of said cylinder at the point *b*, and its lower end communicating with a pipe, C, hereafter described. D is an outside casing surrounding the spiral or worm B and the cylinder A. The upper end of the casing D is contracted and extended upward to form a smoke-pipe, and the lower end, below the spiral B, contains an ash-space, E, fire-grate F, and fire-space G. H is a barrel or tank, seated on a suitable support, with its lower end about the height of the lower end of the cylinder A. C is a pipe connecting the lower end of the tank H with the lower end of the cylinder A. I is a pipe connecting the upper end of the tank H with the upper end of the cylinder A. J is a pipe leading from the interior of the cylinder A at its upper end out through the casing D.

The operation of our invention is as follows: The water is placed in the tank H, and, flowing through the pipe C, enters both the spiral B and the cylinder A until they are full to any point below, say, two-thirds of their height. Fire is now placed in the fire-box, and has free access to all parts of the exterior surfaces of the cylinder A and spiral B, thus utilizing to the greatest extent all of the heat generated in the fire-box G in heating both the water and steam spaces in said cylinder and encircling-worm, while, at the same time, their arrangement is such as to keep up a free circulation of the water therein and allow it to rise and part with its steam. The water in the worm, becoming hotter than the water in the cylinder, will naturally rise and flow into the cylinder at its top, and the water in the cylinder, being cooler, will flow out through the pipe C and into the lower end of the spiral, thus keeping up a perfect circulation and facilitating the passage of the steam to the top of the cylinder A, from which it may be taken by the pipe J and delivered to any desired tank or vessel containing feed to be cooked.

K is a stop-cock in the pipe I, the key of which may be turned to close the pipe I when it is desired to replenish the water in the tank H. L is a check-valve in the pipe C, and, opening toward the cylinder A, will prevent back pressure when it exists. M is a stop-cock in the delivery-pipe J.

We claim as our invention—

The cylinder A, spiral B, and casing D, when constructed substantially as described, and arranged to operate with the pipes C, I, and J, and with the tank H, substantially as described, and for the purpose set forth.

HENRY M. RULON.
JESSE F. RULON.

Witnesses:
P. F. SMITH,
SAMUEL M. COWAN.